US008830235B1

(12) United States Patent
Guskov et al.

(10) Patent No.: US 8,830,235 B1
(45) Date of Patent: Sep. 9, 2014

(54) NON-UNIFORM RELAXATION PROCEDURE FOR MULTIRESOLUTION MESH PROCESSING

(75) Inventors: Igor V. Guskov, Pasadena, CA (US); Peter Schröder, Pasadena, CA (US); Wim Sweldens, New Providence, NJ (US)

(73) Assignees: Alcatel Lucent, Boulogne-Billancourt (FR); California Institute of Technology, Pasadena, CA (US); Trustees of Princeton University, Princeton, NJ (US)

( * ) Notice: Subject to any disclaimer, the term of this patent is extended or adjusted under 35 U.S.C. 154(b) by 1552 days.

(21) Appl. No.: 09/395,246

(22) Filed: Sep. 13, 1999

(51) Int. Cl.
*G06T 17/20* (2006.01)

(52) U.S. Cl.
USPC ............................................... 345/420

(58) Field of Classification Search
CPC ................... G06T 2207/20016; G06T 17/205
USPC ......... 345/429, 430, 441, 442, 443, 419, 423, 345/589, 581, 582, 583, 584, 585, 586, 587, 345/588, 424; 370/406, 414, 416, 418
See application file for complete search history.

(56) References Cited

U.S. PATENT DOCUMENTS

| 5,748,865 | A | * | 5/1998 | Yamamoto et al. | 345/423 |
|---|---|---|---|---|---|
| 5,886,702 | A | * | 3/1999 | Migdal et al. | 345/423 |
| 5,966,133 | A | * | 10/1999 | Hoppe | 345/420 |
| 6,009,435 | A | * | 12/1999 | Taubin et al. | 707/101 |
| 6,108,006 | A | * | 8/2000 | Hoppe | 345/423 |
| 6,130,673 | A | * | 10/2000 | Pulli et al. | 345/428 |
| 6,169,549 | B1 | * | 1/2001 | Burr | 345/419 |
| 6,208,347 | B1 | * | 3/2001 | Migdal et al. | 345/149 |
| 6,232,980 | B1 | * | 5/2001 | Liepa | 345/430 |
| 6,271,856 | B1 | * | 8/2001 | Krishnamurthy | 345/581 |
| 6,285,372 | B1 | | 9/2001 | Cowsar et al. | 345/420 |

OTHER PUBLICATIONS

Igor Guskov, Wim Sweldens, and Peter Schroder, Multiresolution Signal Processing for Meshes, ACM Press/Addison-Wesley Publishing Co., In Proceedings of the 26th annual conference on Computer graphics and interactive techniques, SIGGRAPH '99, 1999, pp. 325-334.*

H. Hoppe, "Progressive Meshes," in Computer Graphics (SIGGRAPH '96 Proceedings), pp. 99-108, 1996.

P.S. Heckbert and M. Garland, "Survey of Polygonal Surface Simplification Algorithms," Tech. Rep., Carnegie Mellon University, pp. 1-29, 1997.

V. Krishnamurthy and M. Levoy, "Fitting Smooth Surfaces to Dense Polygon Meshes," in Computer Graphics, (SIGGRAPH '96 Proceedings), pp. 313-324, 1996.

(Continued)

*Primary Examiner* — Jeffrey A Brier
(74) *Attorney, Agent, or Firm* — Ryan, Mason & Lewis, LLP

(57) ABSTRACT

An irregular connectivity mesh representative of a surface having an arbitrary topology is processed using a non-uniform relaxation procedure. The non-uniform relaxation procedure minimizes differences between vectors normal to faces of pairs of triangles having a common edge and located within a designated neighborhood of a given vertex. The relaxation procedure may be used to construct subdivision and pyramid algorithms for performing processing operations such as upsampling, downsampling and filtering on irregular connectivity meshes. The signal processing algorithms may be utilized in applications such as smoothing, enhancement, editing, texture mapping and compression.

25 Claims, 4 Drawing Sheets

(56) References Cited

OTHER PUBLICATIONS

M. Eck et al., "Multiresolution Analysis of Arbitrary Meshes," in Computer Graphics (SIGGRAPH '95 Proceedings), pp. 173-182, 1995.

J.C. Xia and A. Varshney, "Dynamic View-Dependent Simplification for Polygonal Models," in Proceedings of Visualization '96, pp. 327-334, Oct. 1996.

H. Hoppe, "View-Dependent Refinement of Progressive Meshes," in Computer Graphics (SIGGRAPH '97 Proceedings), pp. 189-198, 1997.

A. Certain et al., "Hierarchical Computation of PL Harmonic Embeddings," Tech. Rep., University of Washington, pp. 1-23, Jul. 1997.

M. Garland and P.S. Heckbert, "Fast Triangular Approximation of Terrains and Height Fields," Tech. Rep. CMU-CS-95-181, CS Dept., Carnegie Mellon University, pp. 1-19, Sep. 1995.

\* cited by examiner

PLANE CONTAINS BOTH NORMALS AND THEIR DIFFERENCE; PLANE IS ORTHOGONAL TO EDGE $e=\{j,k\}$

NON-UNIFORM RELAXATION PROCEDURE FOR MULTIRESOLUTION MESH PROCESSING

GOVERNMENT RIGHTS

The U.S. Government has a paid-up license in this invention and the right in limited circumstances to require the patent owner to license others on reasonable terms as provided for under grant numbers ACI-9624957, ACI-9721349 and DMS-9874082 from the National Science Foundation.

FIELD OF THE INVENTION

The present invention relates generally to techniques for processing data representative of surfaces having an arbitrary topology, and more particularly to processing techniques which utilize a mesh of interconnected data points to characterize a surface in three or more dimensions.

BACKGROUND OF THE INVENTION

Dense meshes of interconnected data points are used to represent surfaces of arbitrary topology in numerous applications. For example, such meshes routinely result from three-dimensional data acquisition techniques such as laser range scanning and magnetic resonance volumetric imaging followed by surface extraction. These meshes are often configured in the form of a large number of triangles, and typically have an irregular connectivity, i.e., the vertices of the mesh have different numbers of incident triangles. Because of their complex structure and potentially tremendous size, dense meshes of irregular connectivity are difficult to handle in such common processing tasks as storage, display, editing, and transmission.

It is well known that multiresolution representations of dense meshes can be used to facilitate these processing tasks. A conventional approach used to generate such a representation is based on sequential mesh simplification, e.g., progressive meshes (PM), as described in, for example, H. Hoppe, "Progressive meshes," in Computer Graphics (SIGGRAPH '96 Proceedings), pp. 99-108, 1996. Other mesh simplification techniques are described in, e.g., A. Lee et al., "MAPS: Multiresolution Adaptive Parameterization of Surfaces," Computer Graphics (SIGGRAPH '98 Proceedings), pp. 95-104, 1998; P. S. Heckbert and M. Garland, "Survey of polygonal surface simplification algorithms," Tech. Rep., Carnegie Mellon University, 1997; and M. Eck et al., "Multiresolution analysis of arbitrary meshes," in Computer Graphics (SIGGRAPH '95 Proceedings), pp. 173-182, 1995.

The basic objective of classical multiresolution analysis and mesh simplification is to represent meshes in an efficient and flexible manner, and to use this representation in algorithms which address the processing challenges mentioned above. An important element in the design of such algorithms is the construction of "parameterizations," i.e., functions mapping points on a coarse "base domain" mesh to points on a finer original mesh. Once a surface is characterized in this manner, as a function between a base domain and a space of three or more dimensions, many techniques from fields such as approximation theory, signal processing, and numerical analysis may be used to process data representing the surface.

In the case of regularly sampled data, e.g., images, basic signal processing tools such as upsampling, downsampling and filtering exist. These can be used to build subdivision and pyramid algorithms, which are useful in many applications. For example, images are functions defined on Euclidean, i.e., "flat," geometry and are almost always sampled on a regular grid. Consequently, algorithms such as upsampling and downsampling are straightforward to define, and uniform filtering methods are appropriate. This makes Fourier analysis an elegant and efficient tool for the construction and analysis of signal processing algorithms.

In contrast, meshes of arbitrary connectivity form an inherently irregular sampling setting. Additionally, we are dealing with general 2-dimensional manifolds (2-manifolds), possibly with boundaries, as opposed to a Euclidean space. Consequently new algorithms need to be developed which account for the fundamental differences between images and meshes.

A crucial first observation concerns the difference between geometric and parametric smoothness. Geometric smoothness measures how much triangle normals vary over the mesh. Geometric smoothness implies that there exists some smooth, i.e., differentiable, parameterization of the mesh. However, any particular parameterization may well be non-smooth. The smoothness of the parameterizations is important in most numerical algorithms, which work only with the coordinate functions the user provides. The algorithms' behavior, such as convergence rates or the quality of the results, generally depend strongly on the smoothness of the coordinate functions. In the regular setting of an image, or the knots of a uniform tensor product spline, we may simply use a uniform parameterization and will get parametric smoothness wherever there is geometric smoothness. However, in the irregular triangle mesh setting there is a priori no such obvious parameterization. In this case, using a uniformity assumption leads to parametric non-smoothness with undesirable consequences for further processing.

One possible approach to remedy this situation is the use of remeshing in accordance with the techniques in the above-cited A. Lee et al. reference. This approach maintains the original geometric smoothness, but improves the sampling to vary smoothly, thereby enabling subsequent treatment with a uniform parameter assumption without detrimental effects. However, a need still remains for signal processing tools which can work on the original meshes directly.

It should be noted that triangle meshes, also referred to as triangulations, may be of a number of different types, including regular, in which every vertex has degree six; irregular, in which vertices can have any degree; and semi-regular, which are formed by starting with a coarse irregular triangulation and performing repeated quadrisection on all triangles. For semi-regular meshes, coarse vertices are assumed to be of arbitrary degree while all other vertices are assumed to be of degree six. In all cases, we assume that any triangulation is a proper 2-manifold with boundary. On the boundary, regular vertices have degree four. It should also be noted that each of the above-noted triangulations generally utilize different filtering and subdivision algorithms. More particularly, uniform algorithms use so-called fixed coefficient stencils and are typically used only on regular triangulations. In non-uniform algorithms, filter coefficients depend on the connectivity and geometry of the triangulation. Semi-uniform algorithms use filter coefficients which depend only on the local connectivity of the triangulation, and are typically used on semi-regular triangulations.

In order to understand further the role of the parameterization, consider conventional subdivision, such as Loop or Cat-mull-Clark, as described in, e.g., P. Schröder and D. Zorin, Eds., "Course Notes: Subdivision for Modeling and Animation," ACM SIGGRAPH, 1998. In the signal processing context, subdivision can be seen as upsampling followed by filtering. One starts with an arbitrary connectivity mesh and uses regular upsampling techniques such as triangle quadrisection to obtain a semi-regular triangulation. The subdivision weights depend only on connectivity, not geometry. Such stencils can be designed with existing Fourier or spectral techniques. These techniques result in geometrically smooth limit surfaces with smooth, semi-uniform parameterizations. Because traditional subdivision is only concerned with refinement, one has the freedom to choose regular upsampling, and semi-uniform schemes suffice.

The situation is different if we wish to compute a mesh pyramid, i.e., we want to be able to coarsify a given fine irregular mesh and later refine it again. We then need to filter, downsample, upsample and filter again. The downsampling typically involves a standard mesh simplification hierarchy. When subdividing back, we want to build a mesh with the same connectivity as the original mesh and a smooth geometry. This time the upsampling procedure is determined by reversing the previously computed simplification hierarchy. However, we no longer have the choice as to where to place the new vertices that we had in the classical subdivision setting. Consequently, the filters used before downsampling and after upsampling should use non-uniform weights, which depend on the local parameterization. The challenge is to ensure that these local parameterizations are smooth so that subsequent algorithms act on the geometry and not some potentially undesirable parameterization.

Signal processing as an approach to surface fairing in the irregular connectivity mesh setting has been described in G. Taubin, "A Signal Processing Approach to Fair Surface Design," Computer Graphics (SIGGRAPH '95 Proceedings), pp. 351-358, 1995, and G. Taubin, T. Zhang and G. Golub, "Optimal Surface Smoothing as Filter Design," Tech. Rep. 90237, IBM T. J. Watson Research, March 1996. This approach defines frequencies as the eigenvectors of a semi-uniform discrete Laplacian L generalized to irregular triangulations. It utilizes a two step relaxation operator $R=(I+\mu L)(I+\lambda L)$, with $\mu$ and $\lambda$ tuned to minimize shrinkage of the mesh. The resulting smoothing schemes have been used to denoise meshes, to apply smooth deformations, and to build semi-uniform subdivision over irregular meshes. However, such an approach can introduce triangle distortions, and it is not linearly invariant, i.e., when applied to an irregularly-triangulated plane, it introduces tangential movement, also known as movement "within" a surface.

The use of progressive meshes and a semi-uniform discrete Laplacian to perform multiresolution editing on irregular meshes is described in L. Kobbelt, S. Campagna, J. Vorsatz and H.-P. Seidel, "Interactive Multi-resolution Modeling on Arbitrary Meshes," Computer Graphics (SIGGRAPH '98 Proceedings), pp. 105-114, 1998. Given some region of the mesh, discrete fairing is used to compute a smoothed version with the same connectivity. This smoothed region is deformed, and offsets to the original mesh, in the form of so-called detail vectors, are subsequently added back in.

This approach assumes that the 1-ring neighborhood of a given vertex i of the mesh is parameterized over a regular $K_i$-gon. Using this approximation, a semi-uniform discrete Laplacian, referred to as an "umbrella," is computed as $$Lp_i = K_i^{-1} \Sigma_{j \in v_1}{}^{(i)} p_j - p_i$$

This discrete Laplacian is then used in a relaxation operator $R=I+L$ which replaces a vertex with the average of its 1-ring neighbors.

However, smoothing of irregular meshes based on uniform approximations of the Laplacian results in vertex motion "within" the surface, even in a perfectly planar triangulation. Although geometrically smooth, the parameter functions appear non-smooth due to a non-uniform parameterization. This has undesirable effects in a hierarchical setting in which fine levels are defined as offsets from a coarse level. More particularly, using the difference between topologically corresponding vertices in the original and smoothed mesh can lead to detail vectors with large tangential components. To minimize the size of the tangential components of the detail vectors, a search procedure is used to find the nearest vertex on the smoothed mesh to a given vertex on the original mesh. However, this diminishes the advantage of having a smoothed version with the exact same connectivity.

As is apparent from the above, a need exists for an improved mesh relaxation procedure which is linearly invariant, and which can be used as the basis for implementing multiresolution signal processing operations such as upsampling, downsampling and filtering on irregular connectivity meshes, while avoiding the problems associated with the above-described conventional techniques.

SUMMARY OF THE INVENTION

The present invention provides techniques for processing irregular connectivity meshes representing surfaces of arbitrary topology, based on a non-uniform relaxation procedure which minimizes functions based on the geometry and connectivity of the mesh, rather than only the connectivity of the mesh as in conventional techniques.

An illustrative embodiment of the invention provides a non-uniform relaxation procedure which is applied to a set of data points or vertices in the form of a irregular connectivity triangular mesh. The relaxation procedure operates on designated groups of the data points, each of the groups including a number of pairs of triangles, with each of the pairs of triangles sharing a common edge. For example, the procedure may operate on the pairs of triangles sharing a common edge within the 1-ring neighborhood of a given vertex. The procedure adjusts positions of one or more of the data points in a given one of the groups of data points so as to minimize differences between vectors normal to faces of the corresponding pairs of triangles. Each of the differences is computed as a linear function of four of the data points corresponding to the four vertices of two of the triangles sharing a common edge. This linear difference operator has the additional property that it is invariant in the presence of flatness, i.e., if a portion of the mesh is already substantially flat, the difference generated for a pair of the triangles in that portion will automatically have a value of approximately zero without any adjustment in the position of the data points. The non-uniform relaxation procedure may be applied to every vertex of the mesh, such that each application of the procedure generates successively smoother versions of the original mesh. An appropriate order in which to process the vertices of the mesh may be determined using the output of a mesh simplification process.

The above-described relaxation procedure can be implemented as part of a multiresolution signal processing algorithm. For example, it may be part of a subdivision algorithm which generates a finer-resolution mesh from a given mesh. In this case, the subdivision algorithm utilizes the relaxation procedure to determine appropriate positions for additional data points added to a set of data points of the given mesh to produce the finer-resolution mesh. As another example, the relaxation procedure may be implemented as part of a pyramid algorithm which generates a set of geometric meshes of different resolution. In this case, the pyramid algorithm generates a finer-resolution mesh from a given mesh using a subdivision algorithm which utilizes the relaxation procedure to determine appropriate positions for additional data points added to a set of data points of the given mesh to produce the finer-resolution mesh. The subdivision and pyramid algorithms may be used to provide mesh processing functions such as upsampling, downsampling and filtering on irregular connectivity triangle meshes.

The invention is suitable for use in a wide variety of mesh processing applications, including smoothing, enhancement, editing, texture mapping and compression. Advantageously, the non-uniform relaxation procedure is linearly invariant, leaves the shape of the triangles unchanged in planar portions of the mesh, and does not suffer from the above-noted problems concerning tangential components and corresponding movement "within" the surface. Moreover, it affects only geometric smoothness, and therefore does not require the above-noted nearest vertex search procedure.

DETAILED DESCRIPTION OF THE INVENTION

The present invention will be illustrated below in conjunction with exemplary processing techniques applied to surface data in the form of meshes of triangles. It should be understood, however, that the disclosed techniques are suitable for use with a wide variety of other representations of surface data and in numerous other applications. For example, the invention can be applied to surface data in forms other than a mesh of triangles, and can be applied to surface data of more than three dimensions. The term "mesh" as used herein refers to any set of interconnected vertices or other data points which is representative of a surface.

1. Exemplary Mesh Processing System

Figure 1:
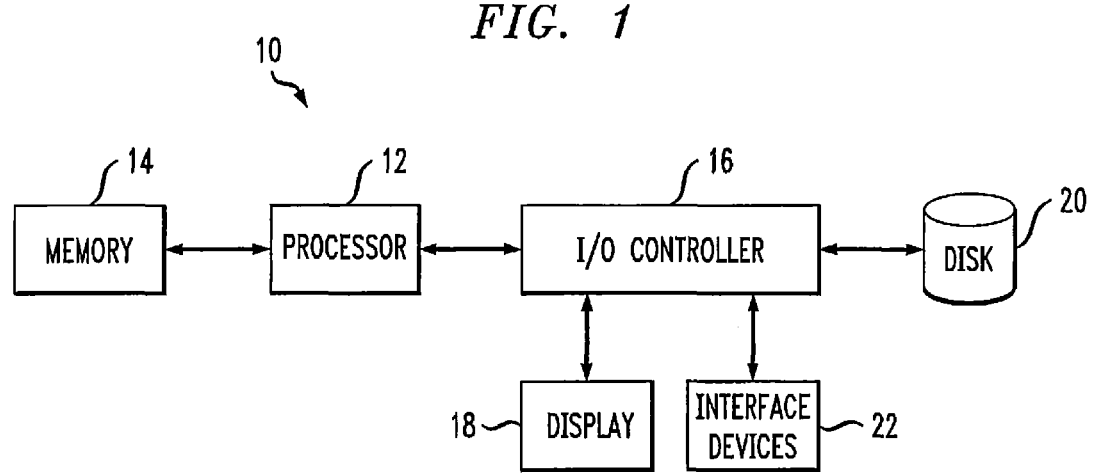
FIG. 1 is a block diagram of a system for processing surface data in accordance with the invention.

FIG. 1 shows an exemplary mesh processing system 10 in which the invention can be implemented. The system 10 includes a processor 12 coupled to a memory 14 and an input/output (I/O) controller 16. The I/O controller 16 in conjunction with the processor 12 directs the operation of a number of peripheral components including a display 18, a disk-based storage device 20 and one or more interface devices 12 which may include, for example, a printer, a keyboard and a network interface card. The elements 12, 14, 16, 18, 20 and 22 of system 10 may represent portions of a desktop or portable personal computer, a microcomputer, a workstation, a mainframe computer or other type of digital data processor. The memory 14 and disk-based storage device 20 may be electronic, magnetic or optical storage devices.

The present invention may be implemented at least in part in the form of a computer software program stored in memory 14 or storage device 20. For example, such a program may be executed by processor 12 on input mesh data to produce a desired output mesh in a predetermined format on display 18. The program may be written in a conventional programming language such as C++ and may make use of standard computational geometry data structures such as those described in, e.g., E. P. Mucke, "Shapes and implementations in three-dimensional geometry," Tech. Rep. UIUCDCS-R-93-1836, University of Illinois at Urbana-Champaign, 1993. The input mesh data may be read from one or more files of disk-based storage device 20, or transmitted to the system 10 over a network connection such as, for example, an Ethernet connection or other suitable local area network (LAN) connection.

2. Non-Uniform Relaxation Procedure

The present invention provides a non-uniform relaxation procedure particularly well suited for use with irregular connectivity meshes. The non-uniform relaxation procedure can be used in conjunction with existing hierarchy-based methods to build subdivision, pyramid, and wavelet algorithms for irregular connectivity meshes, and to provide improved mesh processing in applications such as smoothing, enhancement, editing, animation, and texture mapping.

With regard to coordinate functions, the following description will distinguish a functional setting from a surface setting. The functional setting deals with a function $g(u,v)$ of two independent variables in a plane. The dependent variable g can be visualized as height above the $(u,v)$ parameter plane. In practice, we typically have discrete data $g_i=g(u_i,v_i)$. The sample points $(u_i,v_i)$ are triangulated in the plane and this connectivity can be transferred to the corresponding points $(u_i,v_i,g_i)$ in the three-dimensional space $R^3$. A canonical example of this is a terrain model. The surface setting deals with a triangle mesh of arbitrary topology and connectivity embedded in $R^3$ with vertices $p_i=(x_i,y_i,z_i)$. It is important to treat all three coordinates x, y, and z as dependent variables with independent parameters u and v, giving us three functional settings. The independent parameters are typically unknown and must be estimated. However, the invention can also be used in applications in which the parameters are given.

Notation relating to triangulations will now be introduced. A triangle mesh is denoted as a pair (P, K), where P is a set of N point positions $P=\{p_i \epsilon R^3 | 1 \le i \le N\}$ (either $p_i=(u_i,v_i,f_i)$ in the functional setting or $p_i=(x_i,y_i,z_i)$ in the surface setting), and K is an abstract simplicial complex which contains all the topological, i.e., adjacency information. The complex K is a set of subsets of $\{1, \ldots, N\}$. These subsets are called simplices and come in three types: vertices $v=\{i\} \epsilon V$, edges $e=\{i, j\} \epsilon E$, and faces $f=\{i, j, k\} \epsilon F$, so that $K=V \cup E \cup F$. Two vertices i and j are neighbors if $\{i, j\} \epsilon E$. The 1-ring neighbors of a vertex i form a set $V_1(i)=\{j | \{i, j\} \epsilon E\}$. The degree of vertex i is $K_i=\#V_1(i)$, where # denotes the number of elements of the given set. The edges from i to its neighbors form a set $E_1(i)=\{\{i, j\} | j \epsilon V_1(i)\}$.

Figure 2C:
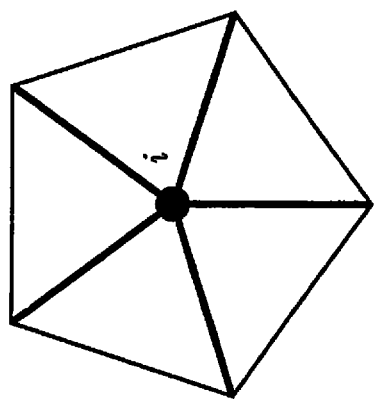
FIGS. 2A, 2B and 2C show a 1-ring neighborhood, a 1-ring with flaps, and an edge neighborhood, respectively, as utilized in a non-uniform relaxation procedure in accordance with the invention.
Figure 2B:
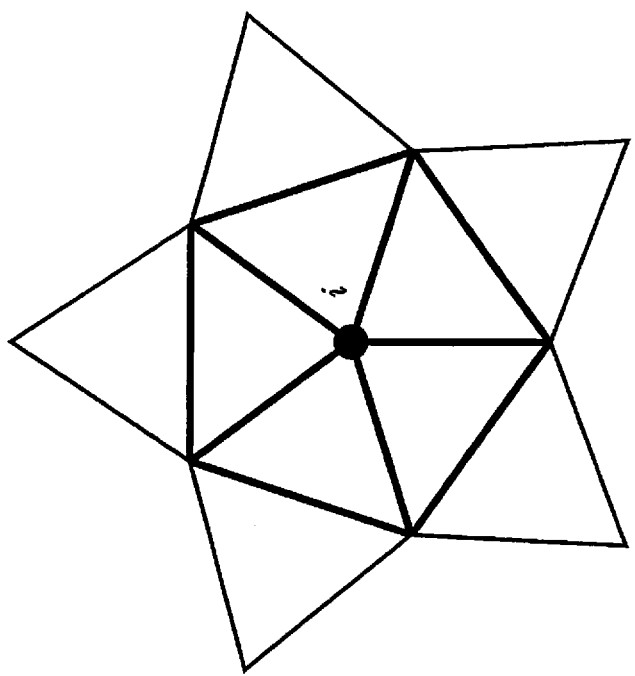
Figure 2A:
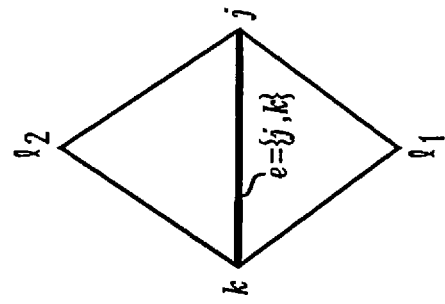

FIG. 2A shows an example of a 1-ring neighborhood of a vertex i. The vertices of the 1-ring neighborhood other than vertex i form $V_1(i)$ and its interior edges form $E_1(i)$. A 1-ring neighborhood with flaps is shown in FIG. 2B. Its vertices other than the vertex i form a set $V_2(i)$ and its interior edges form a set $E_2(i)$. A neighborhood $\omega(e)$ of an edge is formed by the four vertices of its incident triangles. FIG. 2C shows an example of an edge neighborhood $\omega(e)=\{j, k, 1_1, 1_2\}$. This two-triangle edge neighborhood is one example of an arrangement also referred to herein as a "stencil."

A geometric realization $\phi(s)$ of a given simplex s is defined as the strictly convex hull of the points $p_i$ with $i \epsilon s$. The polyhedron $\phi(K)$ is defined as $\cup_{s \epsilon K}\phi(s)$ and consists of points, segments, and triangles in $R^3$.

2.1 Divided Differences in the Functional Setting

The illustrative embodiment of the invention provides a relaxation procedure which is based at least in part on minimizing so-called divided differences. In a one-dimensional setting, divided differences are straightforward to define, but for multivariate settings many different approaches are possible, such as those described in, e.g., I. Guskov, "Multivariate Subdivision Schemes and Divided Differences," Tech. Report, Department of Mathematics, Princeton University, 1998, B. Formberg,"Generation of finite difference formulas on arbitrarily spaced grids," Math. Comput. 51 (1988), pp. 699-706, C. De Boor, "A multivariate divided differences," Approximation Theory VIII 1 (1995), pp. 87-96, and C. De Boor and A. Ron, "On multivariate polynomial interpolation," Constr. Approx. 6 (1990), pp. 287-302. Although the illustrative embodiment to be described herein utilizes a divided differences approach similar to that described in the above-cited I. Guskov reference, it should be understood that other approaches could also be used.

Consider a face $f=\{i,j,k\}$ and the triangle $t=\phi(f)$ where $p_i=(u_i,v_i,g_i)$. Then the first order divided difference of g at f is the gradient of the piecewise linear spline interpolating g, denoted by $\nabla_{\!f}g=(\partial g/\partial u, \partial g/\partial v)$. Note that the gradient depends on the parameter locations $(u_i,v_i)$ and converges in the limit to the first partial derivatives. If we create a three-component vector by adding a third component equal to 1, we obtain the normal $n_f=(-\partial g/\partial u, -\partial g/\partial v, 1)$ to the triangle t. Conversely, the gradient is the projection of the normal in the parameter plane. Consequently the gradient is zero only if the triangle t is horizontal ($g_i=g_j=g_k$).

Figure 3B:
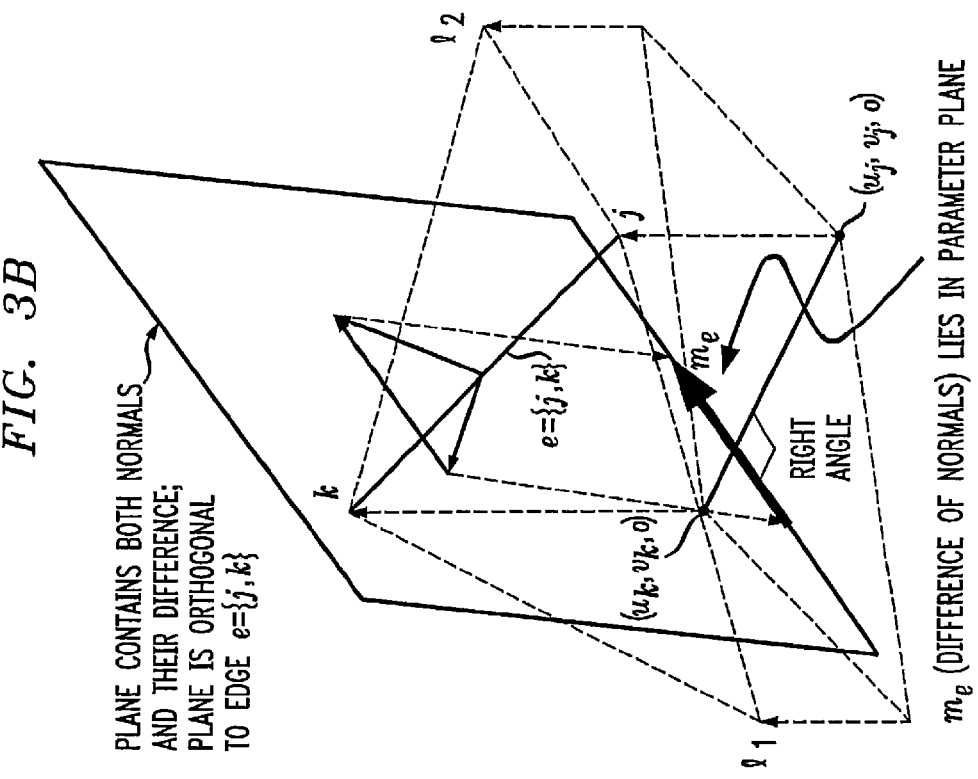
FIGS. 3A and 3B illustrates the determination of divided differences in a functional setting in a non-uniform relaxation procedure in accordance with the invention.
Figure 3A:
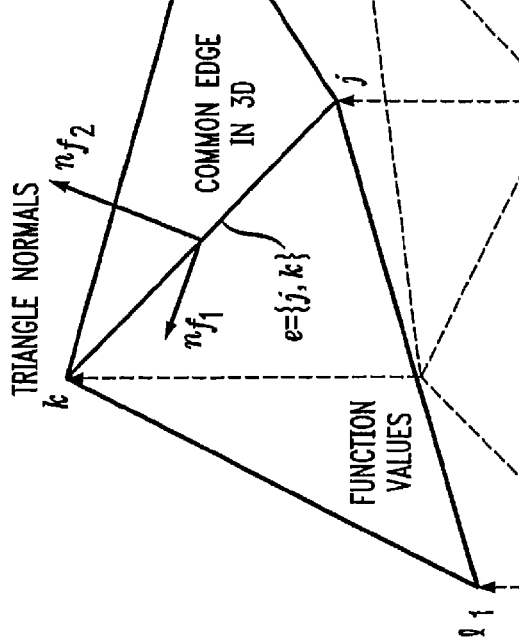

FIGS. 3A and 3B illustrate that in the above-described functional setting, triangles overlie the (u, v) parameter plane, and their normals generate a plane orthogonal to a common edge in three-dimensional space. Any vector in that plane which is also in the parameter plane must be at right angles with the corresponding parameter plane segment. Referring to FIG. 3A, second order differences are defined as the difference between two normals $n_{f_1}$ and $n_{f_2}$ on neighboring triangles and associated with a common edge $e=\{j, k\}$. The two incident faces of the neighboring triangles are $f_1=\{j, k, l_1\}$ and $f_2=\{j, k, l_2\}$, as shown in FIG. 3A. Given that the two normals are orthogonal to the geometric realization $\phi(e)$, their difference $m_e$ is also orthogonal to $\phi(e)$, as shown in FIG. 3B. But the third component of $m_e$ is zero, hence $m_e$ itself lies in the parameter plane, which also contains the segment between $(u_j, v_j, 0)$ and $(u_k, v_k, 0)$. This implies that $m_e$ is orthogonal to the segment and hence only its signed magnitude matters.

It is therefore appropriate to define the second order difference $D_e^2 g$ as the component of $m_e$ orthogonal to the segment in the parameter plane. $D_e^2 g$ depends on four function values at vertices $\omega(e)=\{j, k, l_1, l_2\}$. Since all operations to compute $D_e^2 g$ are linear (gradient, difference, and projection) so is the entire expression $$D_e^2 g = \sum_{l \in \omega(e)} c_{e,l} g_l.$$

The coefficients are given by $$c_{e,l_1} = \frac{L_e}{A_{[l_1,k,j]}},\ c_{e,l_2} = \frac{L_e}{A_{[l_2,j,k]}}, \quad (1)$$

-continued $$c_{e,j} = -\frac{L_e A_{[k,l_2,l_1]}}{A_{[l_1,k,j]} A_{[l_2,j,k]}},\ c_{e,k} = -\frac{L_e A_{[j,l_1,l_2]}}{A_{[l_1,k,j]} A_{[l_2,j,k]}},$$

where $A_{[k_1,k_2,k_3]}$ is the signed area of the triangle formed by $(u_{k_1}, v_{k_1})$, $(u_{k_2}, v_{k_2})$, and $(u_{k_3}, v_{k_3})$; and $L_e$ is the length of the segment between $(u_j, v_j)$ and $(u_k, v_k)$. All the parameterization information is captured in the edge length and signed triangle areas. Given that we later only use squares of $D_e^2$, the actual sign of the areas is not important as long as the orientations prescribed by (1) are consistent. Also, note that the second order difference operator is zero only if the two triangles lie in the same plane.

2.2 Relaxation in the Functional Setting

The illustrative embodiment of the invention provides a non-uniform relaxation operator which minimizes the above-described second order differences. We define a quadratic energy E, which is an instance of a discrete fairing functional as described in L. Kobbelt,"Discrete Fairing," Proceedings of the Seventh IMA Conference on the Mathematics of Surfaces, pp. 101-131, 1997, as follows:

$$E=\Sigma_{e \in E}(D_e^2 g)^2.$$

The relaxation is computed locally, i.e., for a given vertex i we compute a relaxed function value $Rg_i$ based on neighboring function values $g_j$. $Rg_i$ is defined as the minimizer of $E(g_i)$. Given that the stencil for $D_e^2$ comprises two triangles, all edges which affect $E(g_i)$ belong to $E_2(i)$, as described in conjunction with FIG. 2B, and $$Rg^i=\arg\min E(g_i)=\arg\min \Sigma_{e \in E_2(i)}(D_e^2 g)^2. \quad (2)$$

Since the functional is quadratic the relaxation operator R is linear in the function values. To find the expression, write each of the $D_e^2 g$ with $e \in E_2(i)$, i.e., all second order differences depending on $g_i$, as a linear function of $g_i$:

$$D_e^2 g = c_{e,i} g_i + \alpha_e \text{ with } \alpha_e = \Sigma_{l \in \omega(e) \setminus \{i\}} c_{e,l} g_l.$$

Setting the partial derivative of E with respect to $g_i$ equal to zero yields $$Rg_i = -(\Sigma_{e \in E_2(i)} c_{e,i} \alpha_e)/(\Sigma_{e \in E_2(i)} c_{e,i}^2), \quad (3)$$

which can be rewritten as $$Rg_i = \sum_{j \in V_2(i)} w_{i,j} g_j,\ w_{i,j} = -\frac{\sum_{\{e \in E_2(i) | j \in \omega(e)\}} c_{e,i} c_{e,j}}{\sum_{e \in E_2(i)} c_{e,i}^2}.$$

There are a number of ways to implement the relaxation operator R which trade off speed versus memory. For example, one can precompute and store the $w_{i,j}$ values and use the above expression. As another example, one can use equation (3) to compute R on the fly.

Note that if g is a linear function, i.e., if all triangles lie in one plane, the fairing functional E is zero. Consequently linear functions are invariant under R. In particular, R preserves constants from which we deduce that the $w_{i,j}$ values sum to one.

To summarize, given an arbitrary but fixed triangulation in the parameter plane and function values g, with the associated $(u_i,v_i)$ coordinates, simple linear expressions describe first and second order differences. The coefficients of these expressions depend on the parameterization. The relaxation operator R acts on individual function values to minimize the discrete second order difference energy over the $E_2(i)$ neighborhood of a given point $p_i=(u_i,v_i,g_i)$, leaving linear functions invariant.

2.3 Relaxation in the Surface Setting

To apply the above-described relaxation in the surface setting we need to have parameter values (u, v) associated with every point in a given mesh. Typically such parameter values are not available and must be computed. One possible solution is to compute a global parameterization to a coarse base domain using approaches such as those described in, e.g., A. Lee et al, "MAPS: Multiresolution Adaptive Parameterization of Surfaces," Computer Graphics (SIGGRAPH '98 Proceedings), pp. 95-104, 1998, or M. Eck et al., "Multiresolution Analysis of Arbitrary Meshes," Computer Graphics (SIGGRAPH '95 Proceedings), pp. 173-182, 1995. However, specifying parameter values for an entire region is equivalent to flattening that region and thus invariably introduces distortion. Therefore we wish to keep the parameter regions as small as possible. Typically, one computes parameter values for a certain local neighborhood such as a 1-ring neighborhood, e.g., the 1-ring neighborhood as shown in FIG. 2A.

The present invention utilizes an even more local scheme in which parameter values are specified separately for each of the above-described $D_e^2$ stencils. The two triangles of a given $D_e^2$ stencil, e.g., as illustrated in FIG. 3A, are flattened using a so-called hinge map: using the common edge e={j, k} as a hinge, rotate one triangle until it lies in the plane defined by the other triangle and compute the needed edge lengths and areas from equation (1). Note that the hinge map leaves the areas of the triangles $\phi(f_1)$ and $\phi(f_2)$ unchanged and only affects the areas of the triangles $\phi(\{l_1,l_2,j\})$ and $\phi(\{l_1,l_2,k\})$. The surface relaxation operator is defined as before, but acts on points in $R^3$:

$$Rp_i = \Sigma_{j\in V_2(i)} w_{i,j} p_j.$$

This minimization is similar in some respects to minimizing dihedral angles, as described in H. P. Moreton et al., "Functional optimization for fair surface design," Computer Graphics (SIGGRAPH '92 Proceedings), Vol. 26, 167-176, July 1992. However, minimizing exact dihedral angles is generally difficult in that the expressions depend non-linearly on the points. Instead, one can think of the g as a linear expression which behaves like the dihedral angle.

The above-described relaxation process makes it particularly easy to deal with certain types of features in the mesh. Examples of such features include sharp edges across which one does not wish to smooth. In accordance with the invention, the $D_e^2$ associated with sharp edges or other types of features are simply removed from the fairing functional.

In the case that one of the triangles of the stencil is degenerate, i.e., two of the points of that triangle coincide and its area is zero, then the $D_e^2$ that use this triangle are not defined and simply can be left out from the optimization. This is similar to coinciding knots in the case of splines.

A 1-ring version of the above-described relaxation procedure may be generated by taking the minimum in (2) over $E_1(i)$. The relaxation operator is then computed as in (3) with summations over $E_1(i)$ rather than $E_2(i)$. This 1-ring version of the relaxation process parameterized on a regular $K_i$-gon leads to the same relaxation operator as used in the above-cited L. Kobbelt et al. reference. Our relaxation procedure can thus be seen as a non-uniform linear generalization of the above-described "umbrella." In general, it will generally be more desirable to use the $E_2(i)$ (i.e., 1-ring with flaps) version of the procedure as it typically yields visually smoother surfaces.

Unlike the techniques described in the above-cited L. Kobbelt et al. and G. Taubin references, the techniques of the present invention are linearly invariant, leave the triangle shapes unchanged in planar portions of the mesh and unchanged to the greatest extent possible in non-planar portions of the mesh, and do not suffer from the problems concerning movement "within" the surface as observed in the above-cited L. Kobbelt et al. reference.

3. Multiresolution Signal Processing

Up to this point we have only considered operators which act on a scale comparable to their small finite support. To build more powerful signal processing tools we now consider a multiresolution setting.

Multiresolution algorithms such as subdivision, pyramids, and wavelets require decimation and upsampling procedures. For images, decimation comes down to removing every other row or column. The situation for meshes is more complex, but a considerable body of work is available, as described in P. S. Heckbert and M. Garland, "Survey of polygonal surface simplification algorithms," Tech. rep., Carnegie Mellon University, 1997.

The illustrative embodiment utilizes the Progressive Mesh (PM) approach described in H. Hoppe, "Progressive meshes," in Computer Graphics (SIGGRAPH '96 Proceedings), pp. 99-108, 1996. In the PM setting, an edge collapse provides the atomic decimation step, while a vertex split becomes the atomic upsampling step. For simplicity we only employ half-edge collapses in our implementation. As a priority criterion we use a combination of the Garland-Heckbert quadric error metric, described in M. Garland and P.S. Heckbert, "Surface Simplification Using Quadric Error Metrics," Computer Graphics (SIGGRAPH '96 Proceedings), pp. 209-216, 1996, and edge length to favor removal of long edges, as described in L. Kobbelt, S. Campagna and H.-P. Seidel, "A General Framework for Mesh Decimation," Proceedings of Graphics Interface, 1998.

Each half edge collapse removes one vertex and we number them in reverse so that the one with highest index gets removed first. This gives a sequence of N meshes (P", K"), $1 \leq n \leq N$, and $P''=\{p_i | 1 \leq i \leq n\}$. Later we will consider mesh sequences ($Q^{(n)}$, $K^{(n)}$ where the points on coarser meshes do move from their finest mesh position. These are denoted $q_i^{(n)}$, $i \leq n$.

In traditional signal processing, downsampling creates a coarser level through the removal of a constant fraction of samples. This leads to a logarithmic number of levels. A PM does not have such a notion of levels. However, one may think of each removed vertex as being on its own level, and the number of levels being linear.

Although illustrated using subdivision and pyramid signal processing algorithms, the techniques of the invention can be applied to other signal processing algorithms, such as, e.g., construction of positive weight schemes, and extensions to boundary conditions and tetrahedralizations.

3.1 Subdivision

Subdivision starts from a coarse mesh and successively builds finer and smoother versions, as described in, e.g., P. Schroder and D. Zorin, Eds., "Course Notes: Subdivision for Modeling and Animation," ACM SIGGRAPH, 1998. In signal processing terms it may be viewed as comprising upsampling followed by relaxation. Subdivision has heretofore generally been associated in the literature with either regular or semi-regular meshes with corresponding uniform or semi-uniform operators. If one only has an original, coarse mesh and cares about building a smooth version, then semi-regular is the correct approach.

Our setting is different. The coarse mesh comes from a PM started at the original, finest level. Hence the connectivity of the finer levels is fixed and determined by the reverse PM. Our goal is to use non-uniform subdivision to build a geometrically smooth mesh with the same connectivity as the original mesh and with as little triangle shape distortion as possible. Such smoothed meshes can subsequently be used to build pyramid algorithms.

Subdivision is computed one level at a time starting from level $n_o$ in the progressive mesh) $Q^{(n_0)}=P^{(n_0)}$. Since the reverse PM adds one vertex per level, our non-uniform subdivision is computed one vertex at a time. We denote the vertex positions as $Q^{(n)}=\{q_i^{(n)}|1\leq i\leq n\}$ $(n\geq n_0)$ and use meshes $(Q^{(n)}, K^{(n)})$ with the same connectivity as the PM meshes.

Going from $Q^{(n-1)}$ to $Q^{(n)}$ involves three groups of vertices: (1) the new vertex n, which is introduced together with a point position $q_{n(n)}$ to be computed; (2) the relatively small number of points from the $Q^{(n-1)}$ mesh change position which correspond to even vertices; and (3) the remainder of the points of $Q^{(n-1)}$, typically the majority of points, which remain unchanged.

More specifically, the new position $q_n^{(n)}$ is computed after upsampling from $K^{n-1}$ to $K^n$:

$$q_n^{(n)}=\Sigma_{j\in v_2^n(j)}w_{n,j}^{(n)}q_j^{(n-1)}.$$

The position of the new vertex is computed to satisfy the relaxation operator using points from $Q^{n-1}$ with weights using areas and lengths of mesh $(P^n, K^{(n)})$. The even points of $Q^{n-1}$ form a 1-ring neighborhood of n. Their respective $V_2^n$ neighborhoods contain n, which has just received an updated position $q_n^{(n)}$:

$$\forall j\in V_1^n(n): q_j^{(n)}=\Sigma_{k\in_2^n(j)\setminus\{n\}}w_{j,k}^{(n)}q_k^{(n-1)}+w_{j,n}^{(n)}q_n^{(n)}.$$

The even vertices are relaxed using the point positions from $Q^{(n-1)}$ (except for $q_n^{(n)}$), using weights coming from $(P^n, K^{(n)})$.

Finally, the remainder of the positions do not change:

$$\forall j\in V^{n-1}\setminus V_1^n(n): q_j^{(n)}=q_j^{(n-1)}.$$

A central ingredient in the above-described construction is the fact that the weights $w_{i,j}^{(n)}$ depend on parameter information from the mesh $P^{(n)}$. Advantageously, a globally or even locally consistent parameterization is not required. For each $D_e^2$ stencil, we use the hinge map as described above. In effect, the original mesh provides the parameterizations and in this way enters into the subdivision procedure. The actual areas and lengths, which make up the expressions for $w_{i,j}^{(n)}$, are assembled based on the connectivity $K^{(n)}$ of level n, and hence induce the level dependence of the weights. As a result, all $w_{i,j}^{(n)}$ values may be precomputed during the PM construction and can be stored if desired for later use during repeated subdivision. It is easy to see that the storage is linear in the total degree, $\Sigma_i K_i$, of the mesh.

In a typical subdivision processing operation, one may start with an irregular triangularization and compute a PM down to a desired coarse resolution using conventional techniques. The above-described non-uniform subdivision technique may then be used to compute the PM starting from the coarse level back to the original finest level so as to obtain a smooth mesh which approximates the original.

It is important to note that the non-uniform approach of the present invention has access to the parameterization information of the original finest mesh whereas conventional semi-uniform techniques do not use this additional information. It should also be noted that, although the goal of a non-uniform subdivision technique which minimizes $D_e^2$ is to obtain $C^1$ smoothness, there is currently no regularity result for our scheme in either the functional or surface setting.

3.2 Pyramid

Another important signal processing tool is the well-known Burt-Adelson (BA) pyramid as described in P. J. Burt and E. H. Adelson, "Laplacian Pyramid as a Compact Image Code," IEEE Trans. Comm. 31, 4 (1983), pp. 532-540. The present invention provides techniques for generalizing the BA pyramid technique to provide a mesh pyramid technique. We start from the finest level points $S^N=P$ and compute a sequence of meshes $(S^n, K^n)$ $(1\leq n\leq N)$ as well as oversampled differences $d_i^{(n)}$ between levels.

Figure 4:
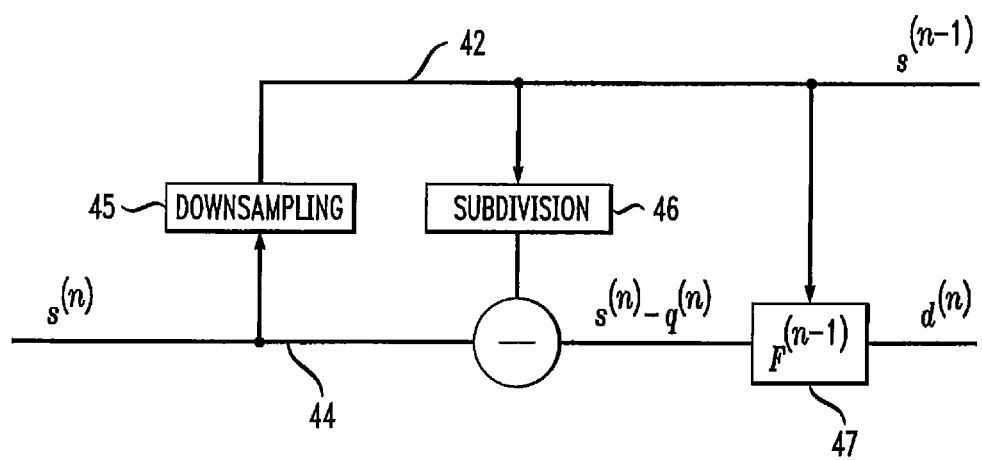
FIG. 4 illustrates a pyramid-based signal processing technique in which the non-uniform relaxation procedure of the present invention may be utilized.

FIG. 4 is a diagram illustrating the manner in which one can move from a level $S^n$ to a level $S^{n-1}$, i.e., remove vertex n, in a mesh pyramid technique in accordance with the present invention. The top line 42 of the diagram represents the points of $S^{n-1}$ while the bottom line 44 represents the points of $S^n$. There are three stages in the corresponding process: downsampling 45, subdivision 46, and computation of details 47. Other implementations may include additional stages, e.g., a presmoothing stage. Presmoothing is used in the original BA pyramid approach in order to avoid aliasing. However, we have found that in a PM context the presmoothing can often be omitted because the downsampling steps, i.e., edge collapses, are chosen carefully, depending heavily on the data. In essence, vertices are removed mostly in smooth regions, where presmoothing does not make a big difference.

In the downsampling stage 45, vertex n is removed using a half-edge collapse.

In the subdivision stage 46, using the points from $S^{n-1}$, we compute subdivided points $q_j^{(n)}$ for the vertex just removed and the surrounding even vertices as described in Section 3.1.

Finally, in stage 47, detail values are computed for all even vertices as well as the vertex n. These detail vectors are expressed in a local frame $F_j^{(n-1)}$ which depends on the coarser level:

$$\forall j\Sigma V_1^n(n)\cup\{n\}: d_j^{(n)}=F_j^{(n-1)}(s_j^{(n)}-q_j^{(n)}).$$

We refer to the entire group of oversampled difference values $d_j^{(n)}$ as an array $d^{(n)}$. In the implementation this array is stored with n.

One of the features of the BA pyramid is that the above procedure can always be inverted independent of which presmoothing operator or subdivision scheme is used. For reconstruction, we start with the points of $S^{n-1}$, subdivide values $q_j^{(n)}$ for both the new and even vertices and add in the details to recover the original values $s_j^{(n)}$.

In order to appreciate the potential of a mesh pyramid in applications, it is important to understand that the details $d^{(n)}$ can be seen as an approximate frequency spectrum of the mesh. The details $d^{(n)}$ with large n come from edge collapses on the finer levels and thus correspond to small scales and high frequencies, while the details $d^{(n)}$ with small n come from edge collapses on the coarser levels and thus correspond to large scales and low frequencies.

With regard to the oversampling factor, a standard image pyramid typically has an oversampling factor of 4/3, while the expected oversampling factor in the above implementation is 7. The advantage of oversampling is that the details are quite small and lead to natural editing behavior, e.g., as described in D. Zorin, P. Schröder and W. Sweldens, "Interactive Multiresolution Mesh Editing," Computer Graphics (SIGGRAPH '97 Proceedings), pp. 259-268, 1997. If needed, the following technique may be used to reduce the oversampling factor. The idea is to use levels with more than one vertex. We can divide the N vertices of V into M levels with M<<N:

$$V = V_o \cup \bigcup_{1 \leq m \leq M} W_m \text{ and } V_m = V_{m-1} \cup W_m.$$

This can be done, e.g., so that the sizes of the $V_m$ grow with a constant factor, as described in D. Dobkin and D. Kirkpatrick, "A Linear Algorithm for Determining the Separation of Convex Polyhedra," Journal of Algorithms 6 (1985), pp. 381-392. The BA pyramid then goes from V. to $V_{m-1}$. First, presmooth all even vertices in $V_m$, then compute subdivided values for all vertices in $W_m$ and their 1-ring neighbors in $V_m$. For the subdivided points, which need not be all vertices of $V_m$, compute the details as differences with the original values from $V_m$. One can see that the above algorithm with oversampling factor 7 is a special case when $W_m = \{m\}$.

The other extreme is the case with only one level containing all vertices. In that case there is no multiresolution as all details live on the same level, and the oversampling factor is 1. By choosing the levels appropriately, one can obtain any desired oversampling between 1 and 7. It is theoretically possible to use the techniques of the invention to build a wavelet-like, i.e., critically-sampled, multiresolution transform based on the Lifting scheme as described in W. Sweldens, "The Lifting Scheme: a Construction of Second Generation Wavelets," Siam J. Math. Anal. 29, 2 (1998), pp. 511-546. However, at this point it is not clear how to design filters that make the transform stable.

It should be noted that, although the present description uses signal processing terminology such as frequency, low pass filter, aliasing, etc. to describe operations on meshes, one should keep in mind that, unlike in the Euclidean setting, there is no formal definition of these terms in the mesh setting. For example, in a mesh the notion of a DC component strictly does not exist. Also, in connection with the pyramid we often talk about frequency bands. Again, one has to be careful as even in the Euclidean setting the coefficients in a pyramid do not represent exact frequencies due to the Heisenberg uncertainty principle.

4. Applications

The algorithms we described above provide powerful signal processing tools. In this section, we consider a variety of applications that can make use of one or more of these signal processing tools. The applications to be considered here include smoothing and filtering, enhancement, texture coordinate generation, vector displacement field editing, and multiresolution editing. It should be understood, however, that the techniques of the invention can also be used in many other applications. These other applications include, e.g., adaptive gridding for time-dependent partial differential equations (PDEs), computing globally smooth parameterizations, extracting texture maps from scanned textures, and space-frequency morphing.

4.1 Smoothing and Filtering

One way to smooth a mesh is through repeated application of the above-described relaxation operator R. Numerically, this process behaves similarly to traditional Jacobi iterations for an elliptic PDE solver. The relaxation rapidly attenuates the highest frequencies in the mesh, but has little impact on low frequencies. Even though each iteration of the operator is linear in the number of vertices, the number of iterations to attenuate a fixed frequency band grows linearly with the mesh size. This results in quadratically increasing run times as the sample density increases relative to a fixed geometric scale. One way to combat this behavior is through the use of appropriate preconditioners, as described in, e.g., L. Kobbelt, S. Campagna, J. Vorsatz and H.-P. Seidel, "Interactive Multiresolution Modeling on Arbitrary Meshes," Computer Graphics (SIGGRAPH '98 Proceedings), pp. 105-114, 1998, or through the use of implicit solvers, as described in, e.g., M. Desbrun, M. Meyer, P. Schröder and A. Barr, "Implicit Fairing of Irregular Meshes Using Diffusion Curvature Flow," Computer Graphics (SIGGRAPH '99 Proceedings), August 1999.

Using a mesh pyramid in accordance with the invention, we can build much more direct and flexible filtering operations. As described in detail above, the details in a pyramid measure the local deviation from smoothness at different scales. In that sense they capture the local frequency content of the mesh. This spectrum can be shaped arbitrarily by scaling particular details. In accordance with the invention, multiresolution filtering operators are built by setting certain ranges of detail coefficients in the pyramid to zero.

For example, a low pass filter can be implemented using the techniques of the invention by setting to zero all detail arrays $d^{(n)}$ for which $n > n_l$. A high pass filter can be implemented by setting to zero all detail arrays $d^{(n)}$ with $n < n_h$. However, for meshes it generally makes little sense to put the coarsest details to zero since this would collapse the mesh. More natural for meshes are stopband filters, which zero out detail arrays $d^{(n)}$ in an intermediate range $n_l < n < n_h$. If desired, these and other filtering operations can be performed in a spatially varying manner due to the space-frequency localization of the mesh pyramid. Advantageously, keeping the original finest level texture coordinates for the vertices of a given mesh can eliminate visual distortion resulting from movement "within" the surface after smoothing.

4.2 Enhancement

Enhancement provides the opposite operation to smoothing in that it emphasizes certain frequency ranges. As before, this can be done in a single resolution manner as well as in the more flexible multiresolution setup. The single resolution scheme is easy to compute and typically works best for fairly small meshes, such as those used as control polyhedra for splines or semi-regular subdivision surfaces. The main idea is to extrapolate the difference between the original mesh and a single resolution relaxed mesh. The enhanced points are given by $$E_{p_i} = p_i + \xi(R^k p_i - p_i),$$

where $\xi > 1$. For example, the above-described relaxation procedure can be applied to an original mesh, followed by an enhancement process. By using various combinations of the different algorithms, unusual effects can be obtained in terms of alteration of the mesh shape and characteristics.

The single level scheme is simple and easy to compute, but limited in its use. For example, it does not compute offsets with respect to local frames. If the mesh contains fine level detail, self intersections quickly appear. As in image enhancement, one must be careful not to amplify high frequency noise. For these reasons we generally prefer the more flexible setup of multiresolution enhancement. The approach is simple, i.e., compute a mesh pyramid, scale the desired details by an appropriate scaling factor such as 1.5 or 2.0, and then reconstruct. As in the previously-described filtering application, the user has control over the different frequency bands, i.e., can apply different scaling factors to different groups of detail arrays $d^{(n)}$. Additionally, the local frames across the many levels of the mesh pyramid tend to stabilize the procedure and lead to a more natural behavior. As a result, the multiresolution enhancement scheme deals better with large scanned meshes which usually contain high frequency noise.

4.3 Subdivision of Scalar Functions on Meshes

The above-described subdivision technique can be used in applications with involve building smooth scalar functions defined on a mesh. Simply start with scalar values on a coarse level and use non-uniform subdivision to build a smooth function defined on the finest level. One such application, known as texture coordinate generation, creates smoothly varying texture coordinate assignments for the finest level mesh from user-supplied texture coordinate assignments at a coarse level. This application is described in greater detail in, e.g., T. Derose, M. Kass and T. Truong, "Subdivision Surfaces in Character Animation," Computer Graphics (SIGGRAPH '98 Proceedings), 1998, pp. 85-94.

Another example application of this type, known as displacement vector field editing, creates a smoothly varying function over a limited region of an irregular mesh and then uses this function to generate a smooth vector displacement field for shape editing purposes. See, e.g., K. Singh and E. Fiume, "Wires: a Geometric Deformation Technique," Computer Graphics (SIGGRAPH '98 Proceedings), pp. 405-414, 1998, and A. Khodakovsky and P. Schröder, "Fine Level Feature Editing for Subdivision Surfaces," ACM Solid Modeling Symposium, 1999.

As an example of the displacement vector field editing application, consider a case in which an original mesh representative of a horse is to be edited such that the neck of the horse is lengthened such that the resulting mesh resembles a giraffe. The user first outlines three regions on the original mesh: a region that remains unchanged (A); a region that will be gradually stretched (B); and a region that will undergo a translation (C). In this example, region (A) is the back body and the four legs of the horse; region (B) is the neck and torso; and region (C) is the head. The boundary between regions (A) and (B) comprises three closed curves. Next, a scalar parameter $\theta$ is defined. The parameter $\theta$ has a value of 0 on the boundary between regions (A) and (B), and a value of 1 on the boundary between regions (B) and (C). The algorithm computes values for $\theta$ that vary smoothly between the values 0 and 1 in region (B).

This is accomplished by running a PM on the interior of region (B) to a maximally coarse level. Then the initial value $\theta=\frac{1}{2}$ is assigned to all interior vertices of the coarse region (B). Next, relaxation is applied to $\theta$ on the coarsest level within (B). This converges quickly because there are few triangles. These $\theta$ values are then used as the starting values for subdivision from the coarsest level back to the original region (B) while keeping the $\theta$ values on the boundary fixed. The resulting $\theta$ values on the finest region (B) vary smoothly between 0 and 1. At the boundary, a smoothing transformation $\theta:=\frac{1}{2}-\frac{1}{2}\cos(\pi\theta)$ may be used. The edit is done by letting the user "click and drag" the head to a desired position. Although displacement vector editing is simple and fast, it has limited use.

4.4 Multiresolution Editing

The invention also provides an algorithm for multiresolution editing for irregular meshes. The algorithm makes use of techniques described in D. Zorin, P. Schröder and W. Sweldens, "Interactive Multiresolution Mesh Editing," Computer Graphics (SIGGRAPH '97 Proceedings), pp. 259-268, 1997, and L. Kobbelt, S. Campagna, J. Vorsatz and H.-P. Seidel, "Interactive Multi-resolution Modeling on Arbitrary Meshes," Computer Graphics (SIGGRAPH '98 Proceedings), pp. 105-114, 1998. The former uses multiresolution details and semi-regular meshes, while the latter uses single resolution details and irregular meshes. The multiresolution editing algorithm of the present invention utilizes multiresolution details in the irregular mesh setting.

In accordance with the algorithm, a user manipulates a group of points $s_i^{(n)}$ in the mesh pyramid, and the finer level details are subsequently added back in. This is the same use of the pyramid as in the Zorin et al. reference, only now for irregular meshes. The approach described in the Kobbelt et al. reference utilizes a multiresolution/multigrid approach to define a smoothed mesh over a user selected region, but then computes single resolution details between the original and smoothed mesh.

The use of multiresolution details is important when the user wishes to make large scale edits in regions with complicated fine scale geometry. Because the multiresolution details are all described in local frames, such details have more flexibility to adjust themselves to a coarse scale edit.

4.5 Compression

Another potential application of the invention is compression. However, it should be noted that the above-described subdivision weights depend on the parameterization which in turn depends on the geometry of the original mesh. Thus, one generally cannot use the subdivision scheme as a predictor in a compression framework unless sender and receiver share parameter information, i.e., the needed areas and lengths to compute the subdivision. For example, a setting where one repeatedly has to communicate functions or attributes defined over a fixed triangulation would justify this overhead.

It should be noted that, for a geometrically smooth irregular mesh, typically only one dimension can effectively be predicted by a subdivision scheme. In general, it is believed that no subdivision scheme can compress the information implicitly present in the parameterization, even for a geometrically smooth mesh. Ideally, for smooth surfaces one would like to use meshes with as little parametric information as possible, e.g., semi-uniform meshes. It is therefore generally desirable to resample onto semi-regular meshes before compression, using smooth parameterizations such as those described in, e.g., M. Eck et al., "Multiresolution Analysis of Arbitrary Meshes," Computer Graphics (SIGGRAPH '95 Proceedings), pp. 173-182, 1995, and A. Lee et al. "MAPS: Multiresolution Adaptive Parametrization of Surfaces," Computer Graphics (SIGGRAPH '98 Proceedings), pp. 95-104, 1998.

The above-described embodiments of the invention are intended to be illustrative only. For example, the invention can be used with a wide variety of different types of meshes, and in conjunction with signal processing techniques and applications other than those described herein. As previously noted, the invention can be implemented at least in part in the form or one or more software programs stored on an electronic, magnetic or optical storage medium, and executed by a computer or other data processing device. These and numerous other alternative embodiments of the invention within the scope of the following claims will be apparent to those skilled in the art.

What is claimed is:

1. A method implemented in a data processing device comprising the steps of:
   receiving a first computer graphic image from a scanning device, the first computer graphic image being representative of a surface of at least one physical object;
   applying multidimensional data acquisition and surface extraction to the first computer graphic image to generate a first geometric mesh comprising a set of data points representative of the surface of the physical object;
   applying a relaxation procedure to at least a subset of the data points of the first geometric mesh, wherein the relaxation procedure operates on designated groups of the data points, each of the groups including a plurality of pairs of geometric shapes each sharing a common edge, and adjusts positions of at least a subset of the data points in a given one of the groups of data points so as to minimize differences between vectors normal to faces of the corresponding pairs of geometric shapes to generate a second geometric mesh comprising a multiresolution representation of the surface of the physical object, the second geometric mesh being different than the first geometric mesh;
   producing at least a second computer graphic image of the surface by processing the second geometric mesh, the second computer graphic image being different than the first computer graphic image; and
   displaying the second computer graphic image in a manner visually perceptible to a user.

2. The method of claim 1 wherein the first geometric mesh has an irregular connectivity.

3. The method of claim 1 wherein the first geometric mesh is a triangular mesh comprising a plurality of triangles having vertices corresponding to the data points, and the pairs of geometric shapes each sharing a common edge comprise pairs of the triangles.

4. The method of claim 3 wherein each of the groups of data points comprises a set of data points in a 1-ring neighborhood of a given data point corresponding to a given vertex.

5. The method of claim 3 wherein a given one of the differences comprises a linear function of four of the data points corresponding to the four vertices of two of the triangles sharing a common edge.

6. The method of claim 3 wherein if a portion of the first geometric mesh is substantially flat, the difference generated for a pair of the triangles in that portion automatically has a value of approximately zero without any adjustment in the position of the data points.

7. The method of claim 1 wherein the relaxation procedure is implemented as part of a multiresolution signal processing algorithm which processes the first geometric mesh to generate the second geometric mesh.

8. The method of claim 7 wherein the multiresolution signal processing algorithm generates a set of meshes of different resolution, such that a finer-resolution mesh in the set is generated from another mesh of the set by reversing a previously-computed mesh simplification.

9. The method of claim 7 wherein the multiresolution signal processing algorithm is a subdivision algorithm which generates a finer-resolution mesh from a given mesh, and wherein the subdivision algorithm utilizes the relaxation procedure to determine appropriate positions for additional data points added to a set of data points of the given mesh to produce the finer-resolution mesh.

10. The method of claim 7 wherein the multiresolution signal processing algorithm is a pyramid algorithm which generates a set of geometric meshes of different resolution, and wherein the pyramid algorithm generates a finer-resolution mesh from a given mesh using a subdivision algorithm which utilizes the relaxation procedure to determine appropriate positions for additional data points added to a set of data points of the given mesh to produce the finer-resolution mesh.

11. The method of claim 7 wherein the multiresolution signal processing algorithm is applied in at least one of a filtering application, an enhancement application, a texture coordinate generation application, a displacement vector field editing application, a multiresolution editing application, and a compression application.

12. The method of claim 1, wherein the first geometric mesh is representative of a first physical object and the second geometric mesh is representative of a second physical object.

13. The method of claim 1, wherein the scanning device comprises one of a laser range scanning device and a magnetic resonance volumetric imaging device.

14. An apparatus comprising:
   an interface device configured to receive a first computer graphic image from a scanning device, the first computer graphic image being representative of a surface of at least one physical object;
   a memory; and
   at least one processor coupled to the memory, the processor being configured:
      to apply multidimensional data acquisition and surface extraction to the first computer graphic image to generate a first geometric mesh comprising a set of data point representative of the surface of the physical object;
      to apply a relaxation procedure to at least a subset of the data points of the first geometric mesh, wherein the relaxation procedure operates on designated groups of the data points, each of the groups including a plurality of pairs of geometric shapes each sharing a common edge, and adjusts positions of at least a subset of the data points in a given one of the groups of data points so as to minimize differences between vectors normal to faces of the corresponding pairs of geometric shapes to generate a second geometric mesh comprising a multiresolution representation of the surface of the physical object, the second geometric mesh being different than the first geometric mesh;
      to produce at least a second computer graphic image of the surface by processing the second geometric mesh, the second computer graphic image being different than the first computer graphic image; and
      to display the second computer graphic image in a manner visually perceptible to a user.

15. The apparatus of claim 14 wherein the first geometric mesh has an irregular connectivity.

16. The apparatus of claim 14 wherein the first geometric mesh is a triangular mesh comprising a plurality of triangles having vertices corresponding to the data points, and the pairs of geometric shapes each sharing a common edge comprise pairs of the triangles.

17. The apparatus of claim 16 wherein each of the groups of data points comprises a set of data points in a 1-ring neighborhood of a given data point corresponding to a given vertex.

18. The apparatus of claim 16 wherein a given one of the differences comprises a linear function of four of the data points corresponding to the four vertices of two of the triangles sharing a common edge.

19. The apparatus of claim 16 wherein if a portion of the first geometric mesh is substantially flat, the difference generated for a pair of the triangles in that portion automatically has a value of approximately zero without any adjustment in the position of the data points.

20. The apparatus of claim 14 wherein the relaxation procedure is implemented as part of a multiresolution signal processing algorithm which processes the first geometric mesh to generate the second geometric mesh.

21. The apparatus of claim 20 wherein the multiresolution signal processing algorithm generates a set of meshes of different resolution, such that a finer-resolution mesh in the set is generated from another mesh of the set by reversing a previously-computed mesh simplification.

22. The apparatus of claim 20 wherein the multiresolution signal processing algorithm is a subdivision algorithm which generates a finer-resolution mesh from a given mesh, and wherein the subdivision algorithm utilizes the relaxation procedure to determine appropriate positions for additional data points added to a set of data points of the given mesh to produce the finer-resolution mesh.

23. The apparatus of claim 20 wherein the multiresolution signal processing algorithm is a pyramid algorithm which generates a set of geometric meshes of different resolution, and wherein the pyramid algorithm generates a finer-resolution mesh from a given mesh using a subdivision algorithm which utilizes the relaxation procedure to determine appropriate positions for additional data points added to a set of data points of the given mesh to produce the finer-resolution mesh.

24. The apparatus of claim 20 wherein the multiresolution signal processing algorithm is applied in at least one of a filtering application, an enhancement application, a texture coordinate generation application, a displacement vector field editing application, a multiresolution editing application, and a compression application.

25. An article of manufacture for storing one or more software programs, wherein the one or more programs when executed on a data processing device implement the steps of:
receiving a first computer graphic image from a scanning device, the first computer graphic image being representative of a surface of at least one physical object;
applying multidimensional data acquisition and surface extraction to the first computer graphic image to generate a first geometric mesh comprising a set of data points representative of the surface of the physical object;
applying a relaxation procedure to at least a subset of the data points of the first geometric mesh, wherein the relaxation procedure operates on designated groups of the data points, each of the groups including a plurality of pairs of geometric shapes each sharing a common edge, and adjusts positions of at least a subset of the data points in a given one of the groups of data points so as to minimize differences between vectors normal to faces of the corresponding pairs of geometric shapes to generate a second geometric mesh comprising a multiresolution representation of the surface of the physical object, the second geometric mesh being different than the first geometric mesh;
producing at least a second computer graphic image of the surface by processing the second geometric mesh, the second computer graphic image being different than the first computer graphic image; and
displaying the second computer graphic image in a manner visually perceptible to a user.

* * * * *

UNITED STATES PATENT AND TRADEMARK OFFICE
CERTIFICATE OF CORRECTION

PATENT NO. : 8,830,235 B1
APPLICATION NO. : 09/395246
DATED : September 9, 2014
INVENTOR(S) : I. V. Guskov et al.

Page 1 of 2

It is certified that error appears in the above-identified patent and that said Letters Patent is hereby corrected as shown below:

IN THE SPECIFICATION:

Column 3, line 60, please change "$Lp_i = K_i^{-1} \sum_{j=1}^{(i)} p_j - p_i$" to -- $Lp_i = K_i^{-1} \sum_{j \in V_1(i)} p_j - p_i$ --

Column 8, line 1, please change "$C_{e,j} = -\frac{L_e A[k, l_2, l_1]}{A[l_1, k, j] A[l_2, j, k, l]}$" to -- $C_{e,j} = -\frac{L_e A[k, l_2, l_1]}{A[l_1, k, j] A[l_2, j, k]}$ --

Column 8, line 44, please change "$Rg_i = -(\sum_{e \in E_2(i)} C_{e,i} \alpha_e) / (\sum_{e \in E_2(i)} C_{e,i}^2)$"

to -- $Rg_i = -(\sum_{e \in E_2(i)} C_{e,i} \alpha_e) / (\sum_{e \in E_2(i)} C^2_{e,i})$ --

Column 8, line 50, please change "$Rg_i = \sum_{j \in V_2(i)} w_{i,j} g_j, w_{i,j} = -\frac{\sum_{(e \in E_2(i)) / e \ni (e)}}{\sum_{e \in E_2(i)} c^2_{e,i}}$"

to -- $Rg_i = \sum_{j \in V_2(i)} w_{i,j} g_j, w_{i,j} = -\frac{\sum_{(e \in E_2(i)) / e \ni (e)} C_{e,i} C_{e,j}}{\sum_{e \in E_2(i)} c^2_{e,i}}$ --

Column 9, line 39, please change "$Rp_i = \sum_{j \in V_2(i)} w_{i,j} p_j$" to -- $Rp_i = \sum_{j \in V_2(i)} w_{i,j} p_j$ --

Column 11, line 23, please change "$q_{n(n)}$" to -- $q_n^{(n)}$ --

Signed and Sealed this
Sixteenth Day of December, 2014

Michelle K. Lee
*Deputy Director of the United States Patent and Trademark Office*

CERTIFICATE OF CORRECTION (continued)

U.S. Pat. No. 8,830,235 B1

Column 11, line 39, please change " $\forall j \in V_1^n(n) : q_j^{(n)} = \sum_{k \in 2^*(j) \setminus \{n\}} w_{j,k}^{(n)} q_k^{(n-1)} + w_{j,n}^n q_n^{(n)}.$ ,"

to -- $\forall j \in V_1^n(n) : q_j^{(n)} = \sum_{k \in V_1^-(j) \setminus \{n\}} w_{j,k}^{(n)} q_k^{(n-1)} + w_{j,n}^n q_n^{(n)}.$ --

Column 12, line 46, please change " $\forall j \sum V_1^n(n) \cup \{n\} : d_j^{(n)} = F_j^{(n-1)}(s_j^{(n)} - q_j^{(n)}).$ ,"

to -- $\forall j \in V_1^n(n) \cup \{n\} : d_j^{(n)} = F_j^{(n-1)}(s_j^{(n)} - q_j^{(n)}).$ --

Column 14, line 53, please change " $E_{pi} = p_i + \xi(R^k p_i - p_i),$ " to -- $Ep_i = p_i + \xi(R^k p_i - p_i),$ --